United States Patent [19]
Walsh et al.

[11] Patent Number: 6,007,694
[45] Date of Patent: Dec. 28, 1999

[54] ELECTROCHEMICAL MACHINING

[75] Inventors: Dave Walsh, River Falls, Wis.; Derrick Jones, Stillwater, Minn.

[73] Assignee: Phillips Plastics Corporation, Prescott, Wis.

[21] Appl. No.: 09/056,356

[22] Filed: Apr. 7, 1998

[51] Int. Cl.[6] .............................. B23H 7/08; B23H 7/32
[52] U.S. Cl. ..................... 205/646; 205/654; 205/686; 204/206; 204/212; 204/224 M
[58] Field of Search .................................. 205/640, 646; 204/206, 224 M, 222, 212

[56] References Cited

U.S. PATENT DOCUMENTS

| | | |
|---|---|---|
| 1,017,671 | 2/1912 | Jenkins . |
| 1,298,155 | 3/1919 | Anthony . |
| 2,434,286 | 1/1948 | Pfann . |
| 2,605,218 | 7/1952 | Gibbs et al. . |
| 2,607,724 | 8/1952 | Laing . |
| 2,773,024 | 12/1956 | Gurry . |
| 2,826,540 | 3/1958 | Keeleric . |
| 2,939,825 | 6/1960 | Faust et al. . |
| 2,953,507 | 9/1960 | Palme . |
| 3,038,475 | 6/1962 | Orcutt . |
| 3,055,812 | 9/1962 | Andersson . |
| 3,056,734 | 10/1962 | Scott . |
| 3,058,895 | 10/1962 | Williams . |
| 3,271,280 | 9/1966 | Shroff . |
| 3,372,099 | 3/1968 | Clifford . |
| 3,449,226 | 6/1969 | Williams . |
| 3,524,803 | 8/1970 | Rannefeld . |
| 3,630,865 | 12/1971 | Minklei et al. . |
| 3,650,922 | 3/1972 | Augustin et al. . |
| 3,654,116 | 4/1972 | Inoue . |
| 3,696,013 | 10/1972 | Tafapolsky . |
| 3,928,154 | 12/1975 | Andrews . |
| 4,522,692 | 6/1985 | Joslin . |
| 4,612,101 | 9/1986 | Wolter et al. . |
| 4,654,116 | 3/1987 | Spacer . |
| 4,667,078 | 5/1987 | Kilcher et al. ...................... 204/206 X |
| 4,690,737 | 9/1987 | Vishnitsky . |
| 4,734,173 | 3/1988 | Walter et al. . |
| 4,803,328 | 2/1989 | Obara .................................. 204/206 X |
| 4,997,534 | 3/1991 | Thornton . |
| 5,034,106 | 7/1991 | Nyberg . |
| 5,062,933 | 11/1991 | Nakano . |
| 5,096,550 | 3/1992 | Mayer et al. . |
| 5,097,637 | 3/1992 | Shepherd . |
| 5,160,589 | 11/1992 | Gionfriddo . |
| 5,242,556 | 9/1993 | Masuzawa . |
| 5,244,548 | 9/1993 | Bruns et al. . |
| 5,900,134 | 5/1999 | Stenneler et al. ...................... 205/640 |

*Primary Examiner*—Donald R. Valentine
*Attorney, Agent, or Firm*—Lappin & Kusmer LLP

[57] ABSTRACT

An electrochemical machining method and apparatus involves the passage of a wire through a programmably controllable electrochemical machine, wherein the wire is tapered along its length to obtain a desired profile. The rate of material removal may be determined, for example, by modulating the power supplied to the electrochemical machine, or by varying the wire speed therethrough. The machine can include an electrical contact cell and a nutation cell. Electrical power is coupled to the wire via the contact cell. Relative orbital motion of the wire and the nutating cell ensures that material removal from the wire is uniform in all directions.

12 Claims, 2 Drawing Sheets

ELECTROCHEMICAL MACHINING

The present invention relates to electrochemical machining of metals, and more particularly, to a method and an apparatus for the continuous formation of complex shapes in wire stock.

BACKGROUND OF THE INVENTION

Electrochemical machining (ECM) removes metal from a work piece as the result of the imposition of a potential difference upon the work piece and an electrode in the presence of an electrolyte. The process has been described as the "reverse" of electroplating. Traditionally, ECM uses relatively high currents of direct current delivered at relatively low voltages. The work piece forms the anode (−) and the electrode forms the cathode (+). Unlike the more common electric discharge machining (EDM), the presence of an electrolyte results in an accelerated electrochemical reaction. Typically, the electrolyte solution interacts with the anode metal to generate oxides of the metal, which are removed from the metal work piece altering the shape of the work piece. The first order effects for the reduction of the metal shape are current, temperature, and chemistry. Second order effects include flow rate of electrolyte past the work piece and the wave form used to excite the system. In a classic prior art system, the cathode is prepared as a mirror image of desired part configuration, the cathode tool is advanced into the work piece which is stationary; and the electrolyte is pressurized to provide a flowing conductive liquid to cool and carry away products of the reaction.

SUMMARY OF THE INVENTION

The present invention discloses several advances in ECM technique and apparatus which together permit the continuous formation of high-accuracy profiles formed on a moving wire work piece. This technique allows the manufacture of a profiled wire in essentially unlimited length and allows for close control over wire profile or contour.

According to one embodiment, a method for machining a wire, comprising the steps of providing a length of wire to be segmented into a plurality of wire work pieces; using an electrochemical machine to form tapered portions along the wire; and programmably controlling the electrochemical machine to provide selected output diameters along designated portions of the wire.

The invention includes several subassemblies which may be used alone or in combination. The first element is an electrochemical "contact" cell for the wire. This cell allows for a very low resistance connection to the wire which is capable of passing relatively large currents. The second assembly is a so-called "nutating" electrode, which orbits the work piece equalizing the charge differential between the work piece and the electrode. This element helps to equalize metal removal around the wire, preserving the concentricity of the finished profile. These two elements form the anode and cathode connections for the power source. The next element is the power source, which is preferably a pulsed DC source. The wave form used to power the anode and cathode can have an important impact on the process as discussed below, as well.

BRIEF DESCRIPTION OF THE DRAWINGS

Throughout the figures, identical reference numerals indicate corresponding structure throughout the several views wherein.

DETAILED DESCRIPTION OF THE PREFERRED EMBODIMENTS

Figure 1:
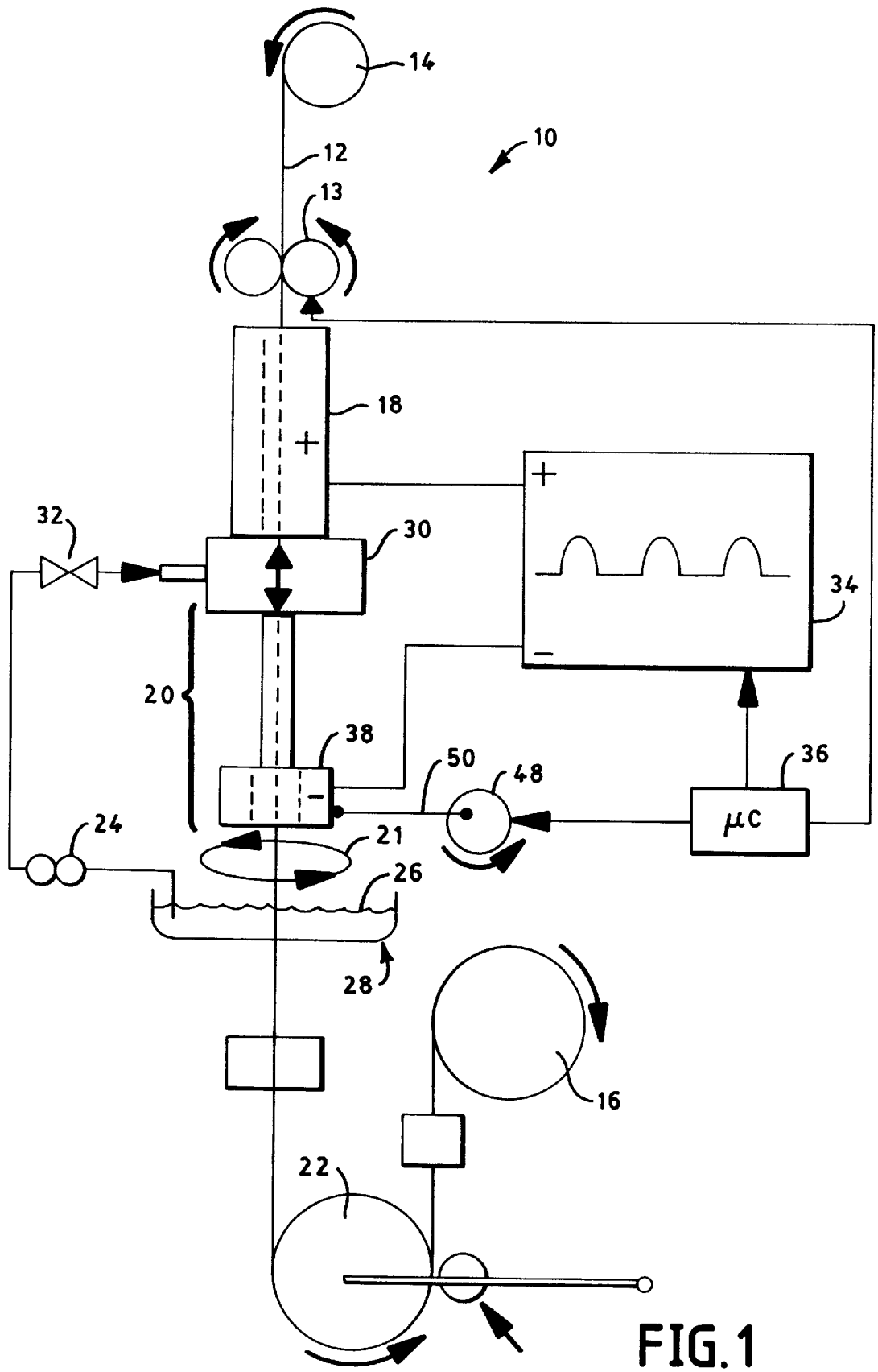
FIG. 1 is a schematic view of the overall system.

The illustrative ECM system described herein permits the accurate and reliable manufacture of wire profiles for various applications. Close control over wire contour, concentricity and surface finish is achieved by the apparatus and methods presented in FIG. 1. Although the invention is disclosed in an illustrative form for machining wire, it should be apparent that "thicker" work pieces may also be machined using the techniques that are presented. For purposes of illustration, the process and apparatus is disclosed operating on a wire work piece having a constant diameter, but it should be understood that profiled wire may be readily substituted for the fixed diameter wire stock shown in the drawings.

FIG. 1 is an illustrative schematic drawing of the overall electrochemical machine (ECM) system 10. A wire work piece 12 is provided from a supply reel 14 and passes through an electrochemical contact cell 18 and a nutation cell 20. In the continuous process system shown, the finished work piece is taken up by a take-up reel 16.

The diameter of the work piece is reduced by electrochemical action with the bulk of metal removal occurring within the nutation cell 20. Power is supplied from a power supply 34 between the nutation cell 20 and the contact cell 18. Electrolyte is supplied to both the nutation cell 20 and the electrochemical contact cell 18 by a pump 24. The pump moves electrolyte 26 from a reservoir 28 to coupler 30, which splits flow between the contact cell 18 and the nutation cell 20. A valve 32 or other suitable flow control methodology can be adopted to regulate the flow of electrolyte through the various cells. A power supply 34 is used to generate an electrical potential between the contact cell 18 and the nutation cell 20. The contact cell 18 is the cathode and the nutation cell forms the anode. The rate of metal removal depends on a number of factors, including electrolyte chemistry, work piece chemistry, voltage difference and wave form, nutation speed, and wire speed. For purposes of illustration, the wire speed should be considered constant and the variations in metal removal will be controlled primarily by modulation of the power from the power supply by micro controller 36. This methodology is preferred because of the relative ease with which the power supply may be regulated. Alternatively, the wire speed may vary and the power maintained constant to control the rate of material removal.

In the illustrative process shown in FIG. 1, the wire moves at constant speed between the supply reel 14 and the take-up reel 16. Power feed rollers 13 may be used to drive the wire. It is preferred to supply constant tension on the wire, which may be achieved by the use of the weighted tension roller 22. In operation, the lower portion of the nutation cell 20 moves in an orbit shown schematically as orbit 21. This orbit 21 forces the wire to circulate within the nutation cell 20.- The orbital motion equalizes the amount of metal removed from the wire work piece 12 and renders metal removal concentric with the major axis of the wire work piece 12. It should be clear that the relative motion between the work piece and the nutation cell 20 can also be achieved by moving the wire in an orbit while retaining the nutation cell 20 in a stationary location. The best trade-off or geometry will depend on the size of the wire and the amount of metal removed.

Both the nutation cell 20 and the electrochemical contact cell 13 need electrolyte to operate. It is preferred to pump electrolyte into the junction between the electrochemical contact cell 18 and the nutation cell 20 through a manifold 32. Electrolyte leaves the nutation cell through a drain and is received by a reservoir 28. Electrolyte leaves the electrochemical contact cell 18 through a drain which may include a valve or restrictor. The restriction serves to equalize flow through the two cells. Experimentation has shown some unexpected dependence of metal removal on electrolyte flow rate. It appears that the electrolyte composition and cooling effects of the electrolyte must be closely controlled. The contact cell 18 may be constructed in any of many ways. As seen in the drawing it is possible to surround the wire with a relatively long length of electrode material such as carbon. The space between the lumen of the carbon electrode and the wire is flushed with electrolyte. The relatively long length and controlled flow of electrolyte results in very low resistance between the wire and the cell. Consequently, the contact cell 18 provides a very low impedance for the current flow associated with metal removal. It should be noted that any change in contact resistance will result in variation in metal removal. Consequently, this can be a very important variable. Experimentation has also shown that for some metals and some wire speeds, more conventional contact rollers can provide a sufficiently low and controlled resistance to couple power to the wire work piece. For this reason, the use of the contact cell 18 may be regarded as optional and the term electrical contact device refers to both the electrochemical cell and a roll contact for the wire.

Figure 2:
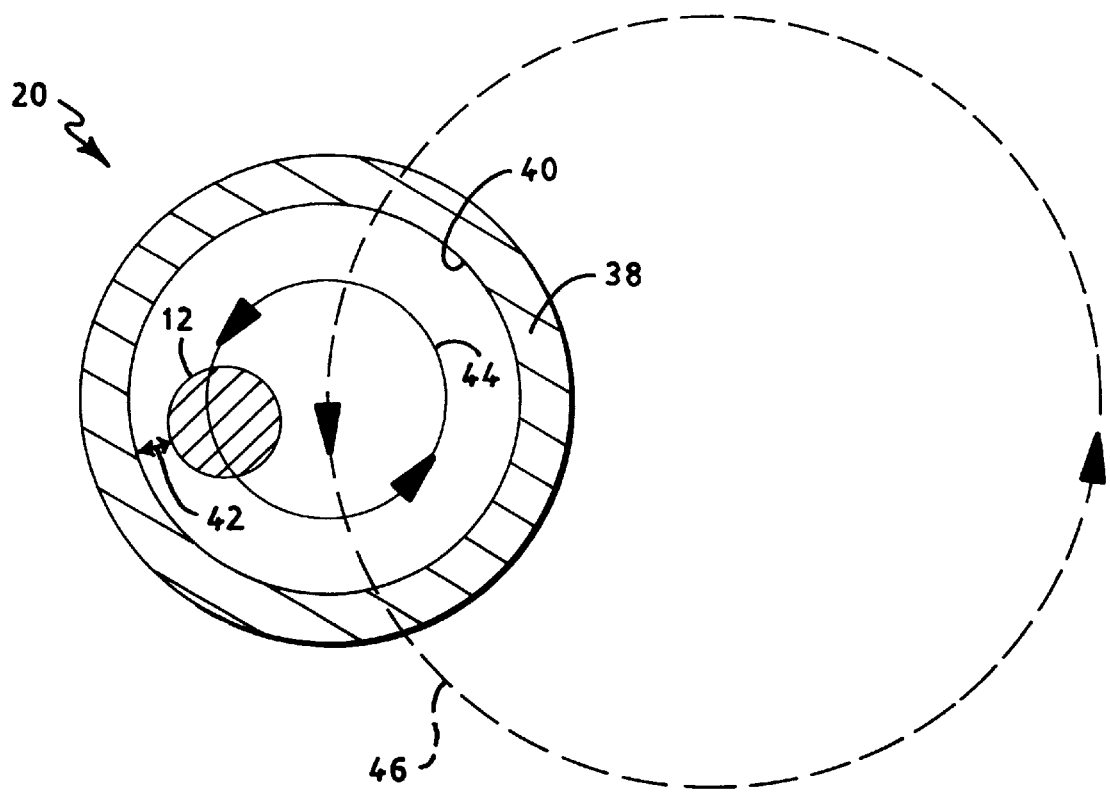
FIG. 2 is a schematic view of the nutation cell.

FIG. 2 shows a schematic axial view of the nutation cell 20. The wire work piece 12 and the nutation cell electrode 38 are shown in cross-section. The wire is moved in an orbit shown as orbital path 44. Motion is imparted to wire by motion of the electrode 38 along orbital path 46. Although not seen in this figure, the wire is positioned with respect to the interior wall of the electrode by a "jewel" bushing or the like. In operation, a gap 42 is formed between the wire 21 and the interior surface 40 of the electrode and these two surfaces move with respect to each other. The two orbital motions ensure that the outer circumference of the work piece is exposed to various portions of the interior surface 40 of the electrode, thus equalizing wear and erosion of the electrode and ensuring a very uniform and concentric removal of metal from the wire work piece. The multiple orbits can be imparted by an eccentric motor linkage arrangement shown as motor 48 and line 50 shown in FIG. 1. It should be apparent that any convenient system can be adopted to impart the required motion. Although the electrode itself is shown moving in FIG. 2, it is possible to have the electrode stay stationary and have the wire driven around the interior of the cavity. One attractive feature of either arrangement is that the nutation cell does not have to be "sized" for a particular wire gauge within broad limits.

It should be apparent that a micro controller 36 can be coupled to the drive rollers, the nutation motor, and power supply to vary the profile of the wire in real time.

It should also be apparent that multiple nutation stations can be arranged along the length of the moving wire to increase production speed.

The above specification, examples and data provide a complete description of the manufacture and use of the composition of the invention. Many embodiments of the invention can be made without departing from the spirit and scope of the invention. For example, another method of controlling wire problems is by controlling feed rate through the cell. Also, the first order effects as discussed in connection with the "Background," can be used as control parameters for producing desired wire profiles. The invention resides in the claims hereinafter appended.

What is claimed is:

1. A method for machining a wire, comprising the steps of:

providing a length of wire to be segmented into a plurality of wire work pieces;

providing an electrochemical machine and moving said wire through said machine to form tapered portions along the wire; and programmably controlling the electrochemical machine to provide selected output diameters along designated portions of the wire.

2. A method for machining, wire, according to claim 1, wherein the wire is stored and delivered before it is separated into said segments.

3. A method for machining a wire, according to claim 1, comprising the further step of segmenting the wire after the steps of forming tapered portions and programmably controlling the electrochemical machine.

4. A method for machining a wire, according to claim 1, comprising the further step of coupling electrical power to the wire so that the wire carries power while the wire is moving through the electrochemical machine.

5. A method for machining a wire, according to claim 4, wherein the wire acts as one of an anode and a cathode during the step of forming tapered portions along the wire.

6. A method for machining a wire, according to claim 1, wherein the step of moving the wire through said electrochemical machine includes the further steps of providing a contact cell and a nutation cell, coupling electrical power to the wire in the contact cell, and causing relative orbital motion of the wire and the nutation cell.

7. A method for machining a wire, according to claim 6, wherein the step of causing relative orbital motion of the wire and the nutation cell establishes and maintains a uniform separation between the nutation cell or cathode and every point in the circumference of the wire or anode.

8. An electrochemical machining apparatus for machining a wire, comprising:

a drive for moving the wire through a work zone;

an electrical contact device adapted for coupling with said wire work piece, said contact device located in said work zone;

a nutation cell adapted to surround said wire for passage of the wire therethrough;

a power supply coupled to said nutation cell and coupled to said contact device for supplying a potential difference between said wire and said nutation cell; and a supply of electrolyte and a pump for supplying electrolyte to said nutation cell to complete a circuit between said wire and said nutation cell, wherein metal is removed from said wire as it passes through said nutation cell.

9. The apparatus of claim 8 wherein said electrical contact device is an electrochemical cell flooded with electrolyte.

10. The apparatus of claim 8, further including means for establishing relative orbital motion of said nutation cell and said wire as said wire passes through said nutation cell.

11. The apparatus of claim 10 wherein said nutation cell is coupled to a motor through a link, and wherein rotational motion of the motor causes orbital motion of the nutation cell around said wire.

12. The apparatus of claim 8, wherein said electrical contact device is a roller contact.

* * * * *